United States Patent Office 3,127,031
Patented Mar. 31, 1964

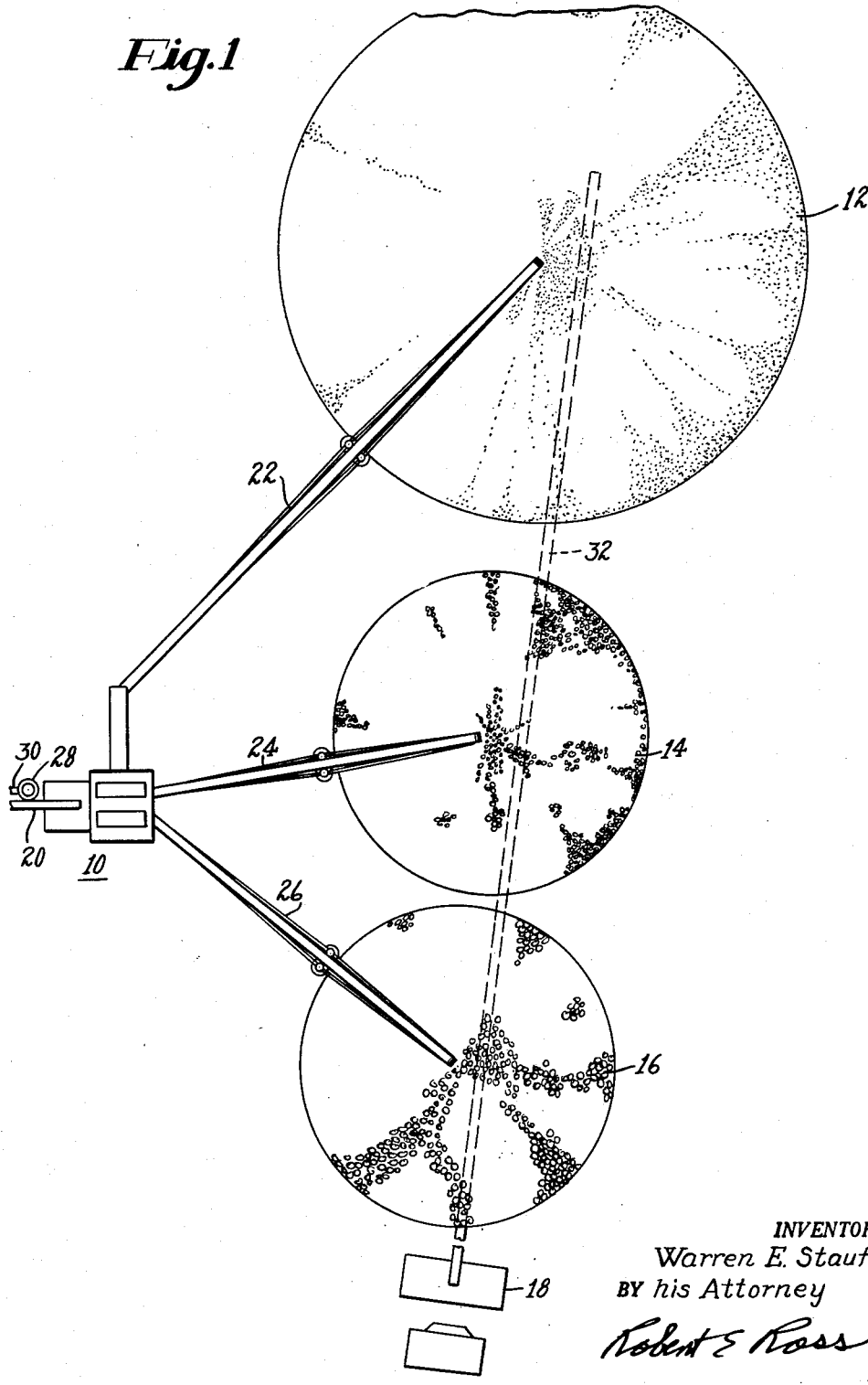

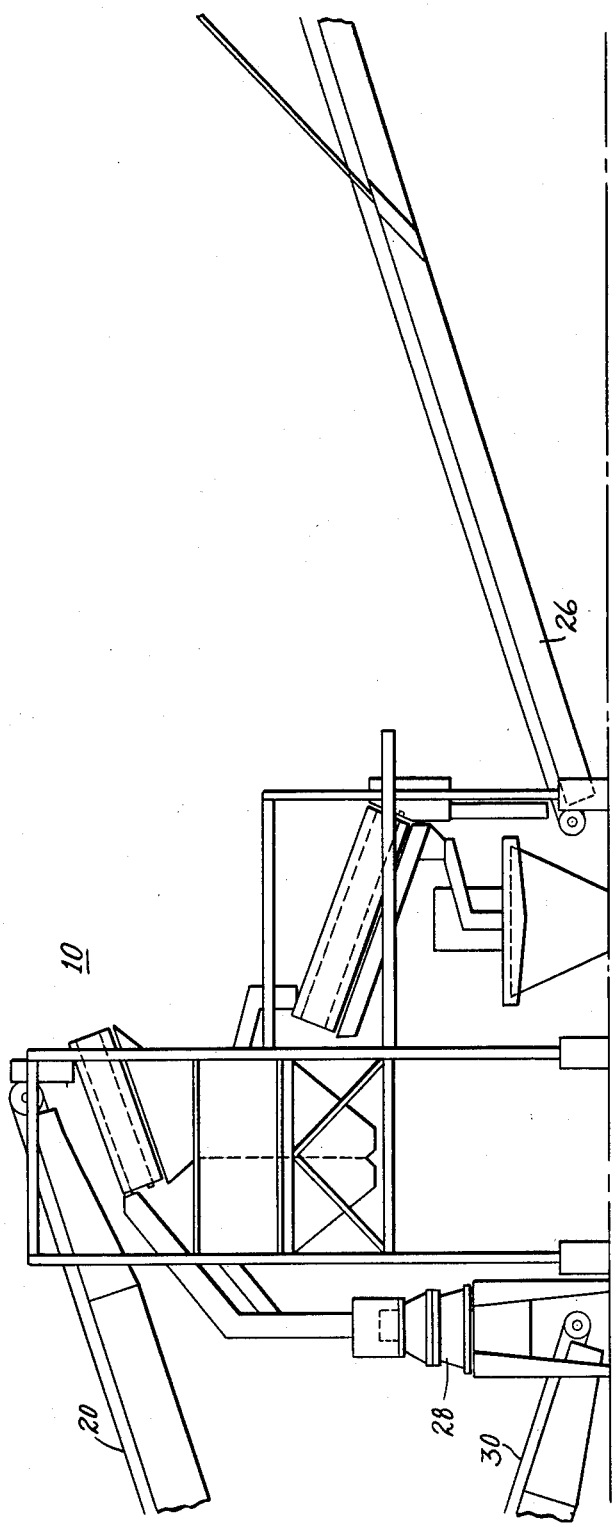

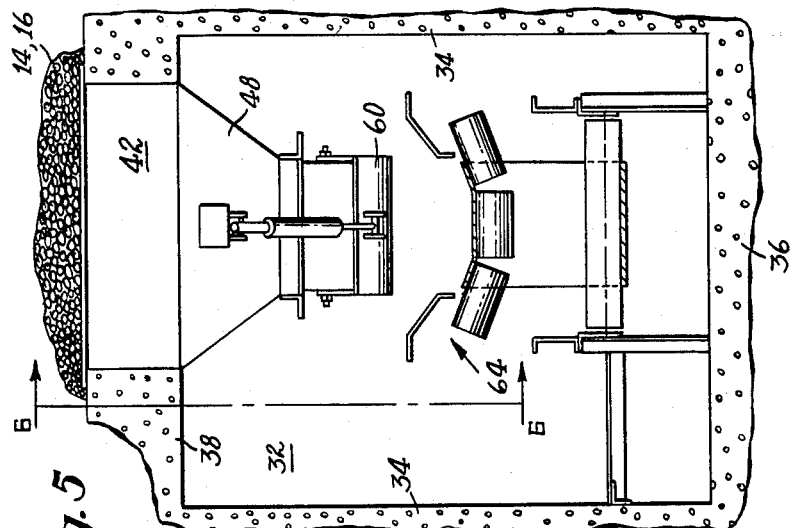
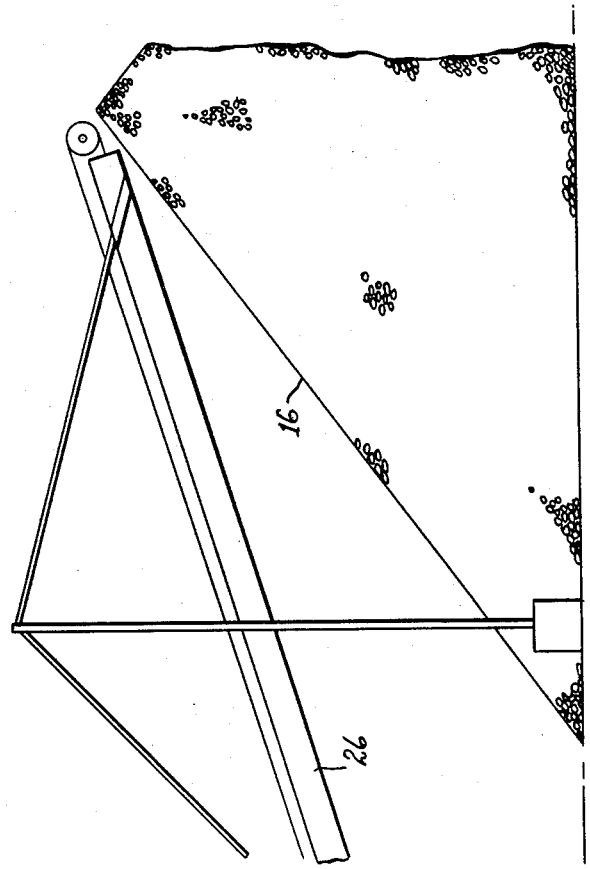

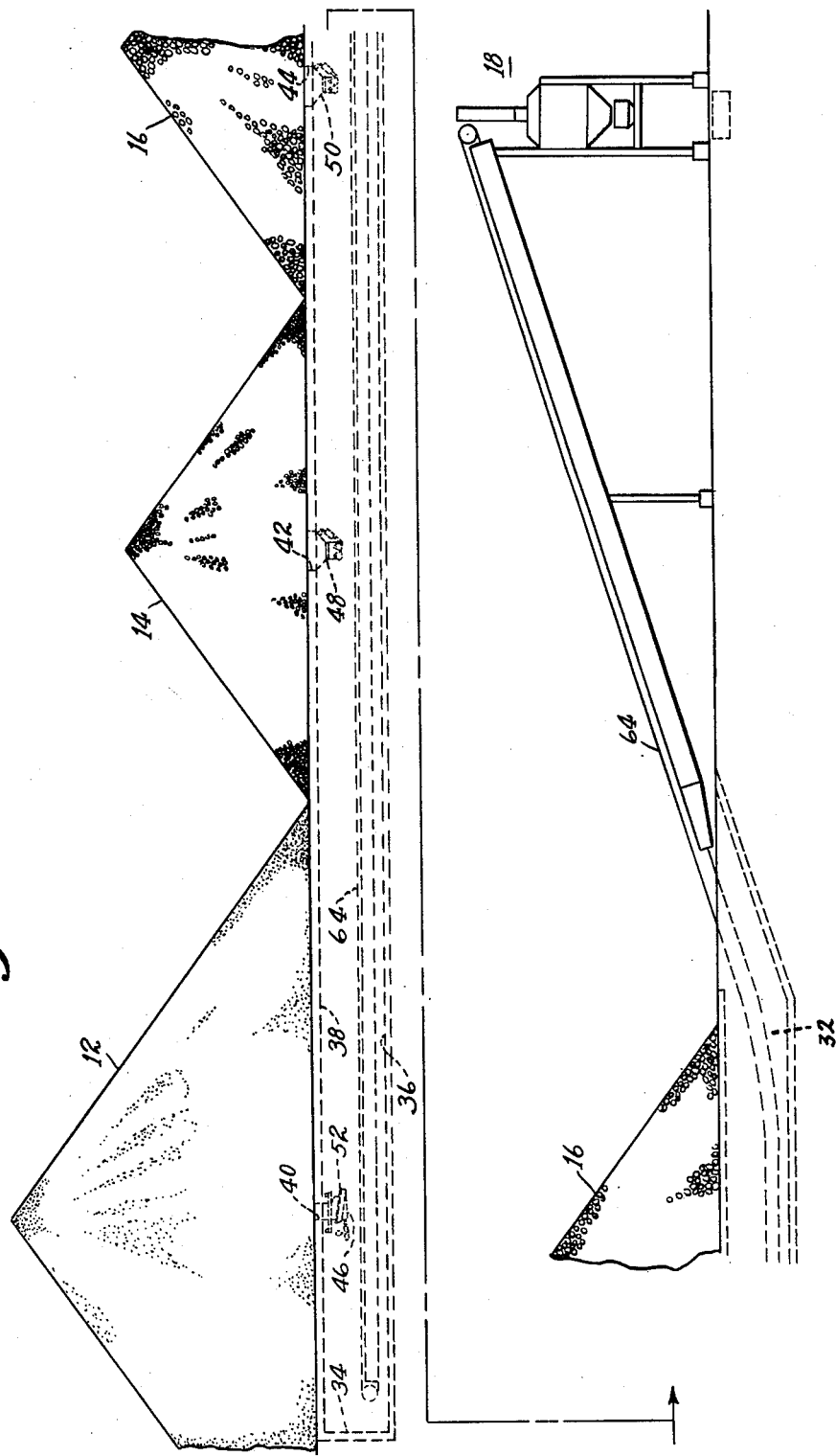

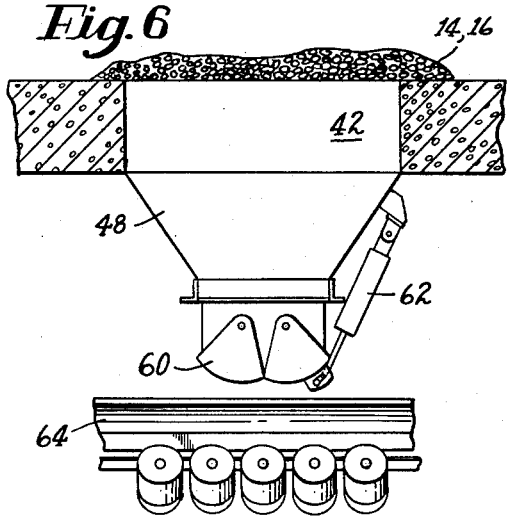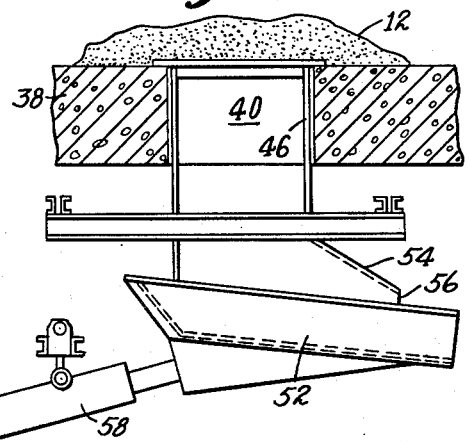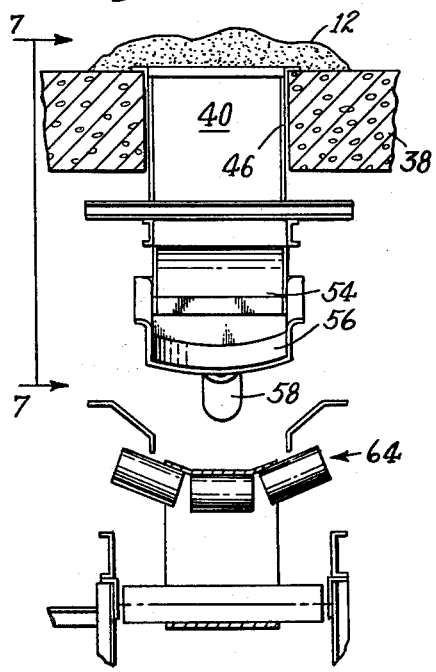

3,127,031
MATERIAL HANDLING SYSTEM
Warren E. Stauffer, Quincy, Mass., assignor to Eastern Engineering Sales Company, Quincy, Mass., a corporation of Massachusetts
Filed July 11, 1961, Ser. No. 123,296
1 Claim. (Cl. 214—16)

This invention relates generally to systems for handling particulate material such as gravel or the like, and has particular reference to a system of this type having novel means for distribution, storage and loading of material of various sizes.

Particulate material such as gravel or crushed stone used as aggregate in concrete is ordinarily provided in several sizes, such as sand, small aggregate, and large aggregate. Raw material for this purpose is usually passed through a set of classifying screens to separate the material into the desired sizes, and the material of each size is transferred by conveyors or other means to individual storage piles. From the storage piles, the material may be loaded directly into trucks for weighing, or may be transferred as needed to overhead storage bins for subsequent gravity feed loading into trucks.

For convenience in accurate weighing of material loaded into a truck, it is desirable that the truck be loaded while sitting on a platform scales. Although this may be accomplished by the use of special types of materials handling equipment, such as so-called front end loaders, considerable time is lost by this method, particularly if the storage pile of material to be loaded is a considerable distance from the scales.

The object of this invention is to provide an aggregate handling system in which a single conveyor is adapted to convey aggregate from any one of a number of storage piles to a storage hopper.

A further object of the invention is to provide an aggregate handling system having a storage hopper with a plurality of storage compartments and a conveyor adapted to supply material to any one of said storage compartments from any one of a number of storage piles.

A further object of the invention is to provide an aggregate handling system in which control means is provided at a multi-compartment storage hopper for directing aggregate from various storage piles into any of said compartments.

Other objects of the invention will be apparent to one skilled in the art from the following detailed description of a specific embodiment thereof.

In the drawing:

FIG. 1 is a schematic top plan view of a gravel handling system embodying the features of the invention;

FIG. 2 is a view in side elevation of the classifying station of FIG. 1;

FIG. 3 is a continuation of the right end of FIG. 2;

FIG. 4 is a view in elevation, partly in section, of the material storage piles and the associate conveyor;

FIG. 5 is a view in transverse section through the conveyor tunnel at an aggregate loading station;

FIG. 6 is a view taken on line VI—VI of FIG. 5;

FIG. 7 is a view taken on line VII—VII of FIG. 8;

FIG. 8 is a view in transverse section through the sand loading station of the tunnel.

Figure 9:
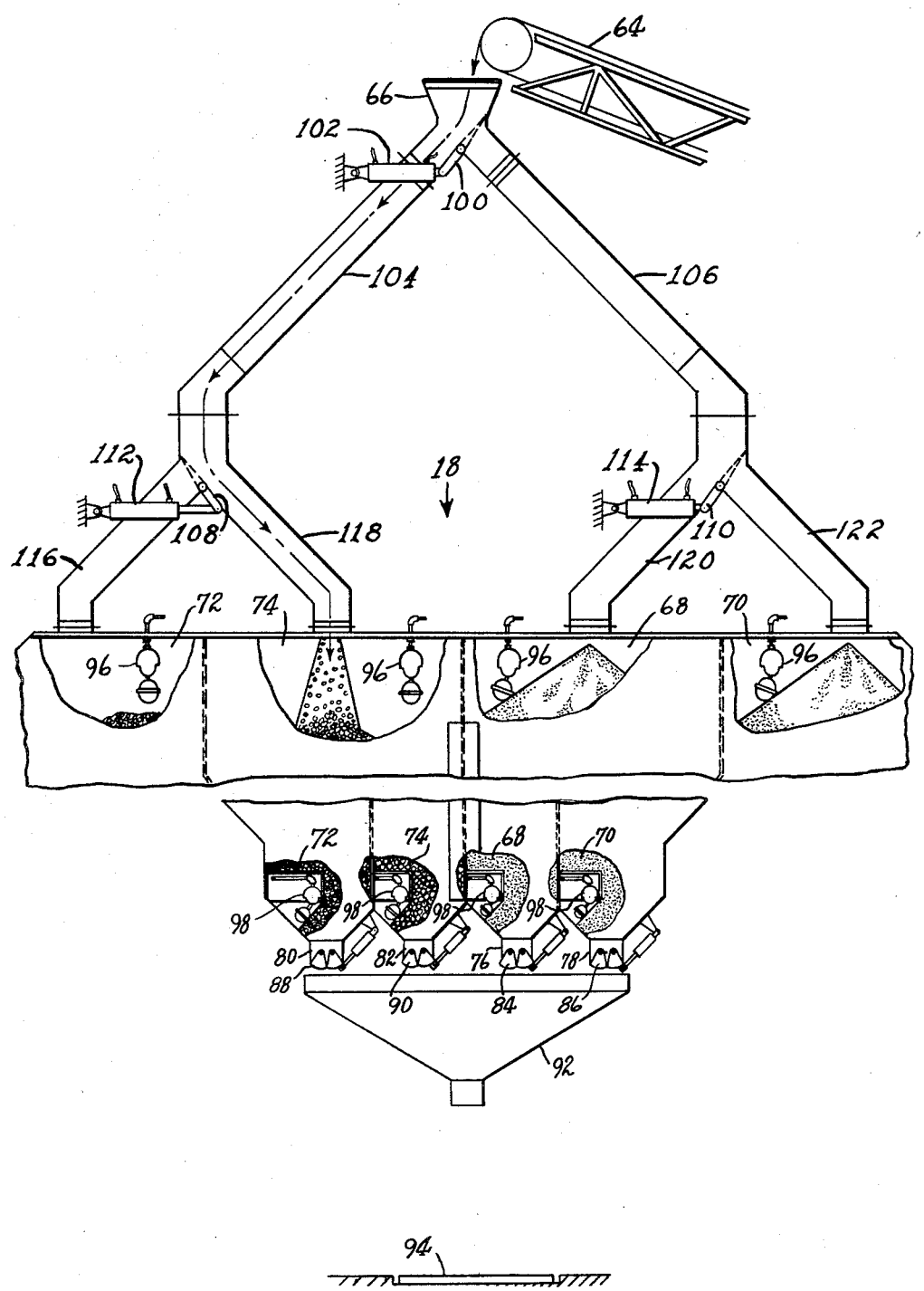
FIG. 9 is a view in elevation of the storage and loading hopper, with the lower portion shown on a reduced scale.

In the illustrated embodiment, the system comprises a classifying station 10, a series of primary storage stations 12, 14, and 16 for the storage of sand, small stone or aggregate, and large stone or aggregate respectively, and are disposed generally in alignment with each other, and a secondary storage and loading station 18 which is disposed generally in alignment with the primary storage stations.

The classifying station 10 may comprise classifying screens (not shown) disposed in the usual manner to separate raw material entering the top thereof from feed conveyor 20 into material of several desired sizes. The sized material is fed directly onto conveyors 22, 24 and 29 to be conveyed to the primary storage stations 12, 14 and 16 respectively. Oversize material may be by-passed through a crusher 28 and returned to the feed conveyor by a return conveyor 30 in the usual manner.

To provide means for conveying material from any of the storage piles to the secondary storage station, which also serves as a loading station, a tunnel 32 extends under the primary storage stations and opens to the surface at a position between the end storage station 16 and the secondary storage station 18.

In the illustrated embodiment, the tunnel is formed by side walls 34, a bottom 36, and a roof 38 formed of concrete. The positions of the primary storage stations are established by discharge apertures 40, 42, and 44 in the tunnel roof having discharge hoppers 46, 48 and 50 mounted therein. A flow control valve is mounted on the lower end of each discharge hopper. The particular type of valve at each station will be dependent on the particular type of material to be stored at that station. Flow control means for different types of aggregate are well known in the art, and the exact structure of those to be described may be varied to accommodate any particular type of aggregate without departing from the scope of the invention.

For example, as illustrated in FIGS. 7 and 8 at the sand storage station 12 an inclined chute 52 may be disposed directly below the hopper, with the walls of the hopper being extended to meet the sides and upper end of the chute, and having an inclined forward wall 54, forming a discharge aperture 56. The angle of repose of sand is such that it will not flow freely through the aperture 56 off the end of the chute, hence the flow of sand may be controlled by feeder means such as a vibrator 58 or the like secured to the chute.

For flow control at the coarse aggregate storage stations 14 and 16 a bin gate type of valve may be disposed at the bottom of the hopper, said gate comprising a pair of clam shell type closures 60 which may be opened and closed by any convenient means such as a pneumatic cylinder 62 (see FIGS. 5 and 6).

To receive the material from the various primary storage stations and discharge it to the top of the secondary storage station, a conveyor 64 is disposed in the tunnel, and extends under each flow control means in succession, and passes out of the tunnel mouth, rising in suitable supports to discharge into a feed hopper 66 at the top of the secondary storage station.

The secondary storage station comprises, in the illustrated embodiment, four compartments 68, 70, 72 and 74 each of which has a discharge aperture, designated 76, 78, 80 and 82 respectively, controlled by discharge valves 84, 86, 88 and 90 respectively, leading to a common discharge chute 92. A weighing scales 94 may be suitably disposed under the discharge chute so that material may be loaded directly onto a truck disposed on the scales.

The level of material in each of the compartments may conveniently be indicated by upper and lower pendulum level indicators 96 and 98 respectively, which may be arranged to close an electrical circuit to a control panel (not shown) when swung away from the vertical position by the presence of material at the appropriate level. Such indications are well known in the art and are illustrated herein as being one method of providing an indication to the operator of the amount of material in the compartments.

To direct material entering the feed hopper 66 to any desired compartment of the storage hopper, a valve 100 is provided which may be operated by a pneumatic cylinder 102, to direct the material into either of two conduits 104 or 106. The lower ends of the conduits are provided with valves 108 and 110, respectively, operated by pneumatic cylinders 112 and 114. The valve 108 is positioned to divert material from conduit 104 to either a conduit 116, discharging to compartment 72, or to conduit 118, discharging to compartment 74. Similarly the valve 110 is adapted to divert material from conduit 106 to either conduit 120, discharging to compartment 68, or to conduit 122, discharging to compartment 70.

In operation of the system, the classifying station will be operated as needed to maintain a suitable amount of material at the various primary storage stations. The tunnel conveyor, the valves of the primary storage stations, and the valves of the secondary storage station will normally be under the control of an operator at or near the secondary storage station. Assuming the compartments to be substantially full, with for example sand in compartments 68 and 70, small aggregate in compartment 72, and coarse aggregate in compartment 74, material from any compartment may be loaded directly into a truck or other receptacle on the scales 94 by actuating the appropriate valve 88—86.

When a low level indicator 98 shows that a compartment, for example the coarse aggregate compartment 74, is nearly empty, the operator may start the conveyor, actuate the flow control valve at the coarse aggregate storage station 16, and actuate the pneumatic cylinders 102 and 112 to move valves 100 and 108 to the position of FIG. 9. Hence the material arriving on the conveyor will be directed to the proper compartment.

When the level of material in compartment 74 has risen to a point where indicator 96 is actuated, a light or other signal on an operator control panel (not shown) is energized. The operator will then close the valve at the primary storage station and allow the conveyor to continue operation until all of the material disposed thereon has been discharged. If at this time another compartment needs replenishing, the operator may open the valve at the appropriate storage station shortly after closing the value at station 16, and visually observe the arrival of the new type of material at the hopper 66 in order to change the setting of the valves 100, 108 and 110 at the proper time.

It will be apparent that the controls of the above described system may be rendered in whole or in part automatic. For example, the action of a low level control in any compartment may be used to start the conveyor, open the flow valve at the appropriate storage station and set the valves in the distribution system to deliver the material to the proper bin. The actuation of the high level control in the compartment may be utilized to close the flow valve at the primary storage station, and to stop the conveyor. A second compartment requires material while the first compartment is being filled, the opening of a valve at a second primary storage station may be delayed by electrical interlock means. Time delay means may also be provided to insure that a valve at a downstream primary storage station does not open until all material on the conveyor from an upstream station has passed.

Since certain other obvious changes may be made in the system without departing from the scope of the invention, it is intended that all matter contained herein be interpreted in an illustrative and not in a limiting sense.

I claim:

A materials handling system for handling particulate materials of various sizes comprising; means for classifying particulate materials by size; first means for conveying and depositing said classified particulate materials in a row of unconfined storage piles on the ground; first controllable discharge valve means associated with and located beneath said material storage piles for selectively discharging each said material storage pile, said first discharge means including vibratory means for facilitating rapid controlled discharge of fine-grained materials; a secondary storage bin positioned above the ground and having therein a row of bin compartments; an underground tunnel located beneath the row of material storage piles and rising to open at the ground surface; second conveying means moving through said underground tunnel and emerging at the surface opening and rising to said secondary storage bin, said second conveying means disposed directly beneath said first controllable discharge valve means to receive the discharge of particulate materials therefrom and disposed above said secondary storage bin to deposit materials thereinto; fixed receiving means at said secondary storage bin in position to receive the deposited materials from said second conveying means; fixed chutes connecting said receiving means to each of said bin compartments; second controllable valve means associated with said fixed chutes to direct the deposited materials to selected bin compartments; a collecting cone positioned beneath said bin compartments; and third controllable valve means associated with said bin compartments for selectively discharging particulate materials from each said bin compartment through said collecting cone into a waiting vehicle; said three controllable valve means being under the control of one operator near said secondary storage bin.

References Cited in the file of this patent

UNITED STATES PATENTS

| | | |
|---|---|---|
| 947,599 | Ransome | Jan. 25, 1910 |
| 1,354,747 | Hiller | Oct. 5, 1920 |
| 2,430,407 | Nelson | Nov. 4, 1947 |
| 2,470,922 | Dunn | May 24, 1949 |
| 2,727,734 | Vincent | Dec. 20, 1955 |